US010817378B2

(12) United States Patent
Suryanarayand et al.

(10) Patent No.: US 10,817,378 B2
(45) Date of Patent: Oct. 27, 2020

(54) MANAGING BOOT FAILURES IN AN INFORMATION HANDLING SYSTEM (71) Applicant: DELL PRODUCTS, L.P., Round Rock, TX (US)

(72) Inventors: Shekar Babu Suryanarayand, Bangalore (IN); Sumanth Vidyadhara, Bangalore (IN); Swamy Kadaba, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 126 days.

(21) Appl. No.: 16/043,238

(22) Filed: Jul. 24, 2018

(65) Prior Publication Data
US 2020/0034237 A1  Jan. 30, 2020

(51) Int. Cl.
G06F 11/00 (2006.01)
G06F 11/14 (2006.01)
G06F 11/07 (2006.01)
G06F 9/4401 (2018.01)

(52) U.S. Cl.
CPC ........ *G06F 11/1417* (2013.01); *G06F 9/4416* (2013.01); *G06F 11/073* (2013.01); *G06F 2201/805* (2013.01)

(58) Field of Classification Search
CPC ... G06F 9/4416; G06F 11/073; G06F 11/1417
See application file for complete search history.

(56) References Cited

U.S. PATENT DOCUMENTS

| 8,910,283 | B1* | 12/2014 | Gusarov | G06F 21/57 726/22 |
| 9,753,809 | B2 | 9/2017 | Antony | |
| 2015/0095644 | A1* | 4/2015 | Gupta | H04L 9/0825 713/168 |
| 2015/0199517 | A1* | 7/2015 | Rose | G06F 21/57 726/22 |
| 2016/0180094 | A1* | 6/2016 | Dasar | G06F 21/575 714/36 |
| 2016/0314047 | A1 | 10/2016 | Goel | |
| 2016/0378603 | A1* | 12/2016 | Herzi | G06F 11/2284 714/6.12 |
| 2016/0378605 | A1* | 12/2016 | Teshome | G06F 11/1417 714/36 |
| 2017/0048304 | A1* | 2/2017 | Singh | H04L 67/06 |
| 2017/0068549 | A1* | 3/2017 | Prasad | G06F 9/4416 |
| 2017/0228237 | A1 | 8/2017 | Ponnuswamy et al. | |
| 2017/0344429 | A1* | 11/2017 | Boyapalle | G06F 11/1417 |

(Continued)

*Primary Examiner* — Joshua P Lottich
(74) *Attorney, Agent, or Firm* — Isidore PLLC (57) ABSTRACT A method, information handling system (IHS) and a management system for managing boot failures in an IHS. The method includes transmitting, via a processor, a request for at least one unified extensible firmware interface (UEFI) image from a boot file or HTTP server and receiving the at least one UEFI image from the HTTP server. The IHS is booted using the UEFI image. The method further includes determining if a boot failure of the IHS has occurred. In response to determining that a boot failure of the IHS has occurred, a memory location is identified in a first memory device for storage of a system dump file. The method also includes storing contents of the first memory device to the system dump file at the indentified memory location of the first memory device.

17 Claims, 9 Drawing Sheets (56) References Cited

U.S. PATENT DOCUMENTS

| | | |
|---|---|---|
| 2017/0371731 A1 | 12/2017 | Khan et al. |
| 2017/0371734 A1 | 12/2017 | Gadi et al. |
| 2018/0074884 A1* | 3/2018 | Cady .................. G06F 11/0787 |
| 2018/0136946 A1* | 5/2018 | El-Haj-Mahmoud ....................... G06F 9/4416 |
| 2018/0239609 A1* | 8/2018 | Jang ..................... G06F 9/4401 |
| 2018/0336086 A1* | 11/2018 | Vaden ................. G06F 11/0778 |
| 2019/0339986 A1* | 11/2019 | Khatri ................... G06F 9/4416 |

\* cited by examiner

MANAGING BOOT FAILURES IN AN INFORMATION HANDLING SYSTEM

BACKGROUND

1. Technical Field

The present disclosure generally relates to information handling systems and in particular to managing boot failures in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Unified extensible firmware interface (UEFI) is a specification that defines a software interface between an operating system and platform firmware. UEFI replaces the basic input/output system (BIOS) found on older information handling systems. UEFI provides a standard architecture and data structure to manage initialization and configuration of devices, booting of platform resources, and passing of control to the operating system. The UEFI specification allows for the extension of platform firmware by loading UEFI driver and application images.

Network booting is a process of booting an information handling system or computer from a network rather than from a local drive. Network booting can be performed using hypertext transfer protocol (HTTP) communications and is referred to as HTTP booting. HTTP booting is a client-server communication based application. HTTP booting allows a client to request and receive UEFI boot files from an external server. Unfortunately, when a failure occurs during HTTP booting, it is difficult to diagnose failures because the operating system (OS) is not operational.

BRIEF SUMMARY

Disclosed are a method, an information handling system (IHS), and a management system for managing boot failures in an IHS.

According to one embodiment, the method includes transmitting, via a processor, a request for at least one unified extensible firmware interface (UEFI) image from a boot file server and receiving the at least one UEFI image from the boot file server. The IHS is booted using the UEFI image. The method further includes determining if a boot failure of the IHS has occurred. In response to determining that a boot failure of the IHS has occurred, a memory location is identified in a first memory device for storage of a system dump file. The method also includes storing contents of the first memory device to the system dump file at the identified memory location of the first memory device. A system administrator can access the system dump file to assist with determining the cause of the boot failure.

According to another embodiment, the IHS includes a processor that is communicatively coupled to a first memory device. The processor is further communicatively coupled to a boot file server. The processor has firmware executing thereon for managing boot failures in the IHS. The firmware configures the processor to transmit a request for at least one unified extensible firmware interface (UEFI) image from the boot file server and to receive the at least one UEFI image from the boot file server. The IHS is booted using the UEFI image. The firmware further configures the processor to determine if a boot failure of the IHS has occurred and, in response to determining that a boot failure of the IHS has occurred, identify a memory location in a first memory device for storage of a system dump file. The firmware further configures the processor to store contents of the first memory device to the system dump file at the identified memory location of the first memory device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS), and a management system for managing boot failures in an IHS.

The method includes transmitting, via a processor, a request for at least one unified extensible firmware interface (UEFI) image from a boot file server and receiving the at least one UEFI image from the boot file server. The IHS is booted using the UEFI image. The method further includes determining if a boot failure of the IHS has occurred. In response to determining that a boot failure of the IHS has occurred, a memory location is identified in a first memory device for storage of a system dump file. The method also includes storing contents of the first memory device to the system dump file at the identified memory location of the first memory device. A system administrator can access the system dump file to assist with determining the cause of the boot failure.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
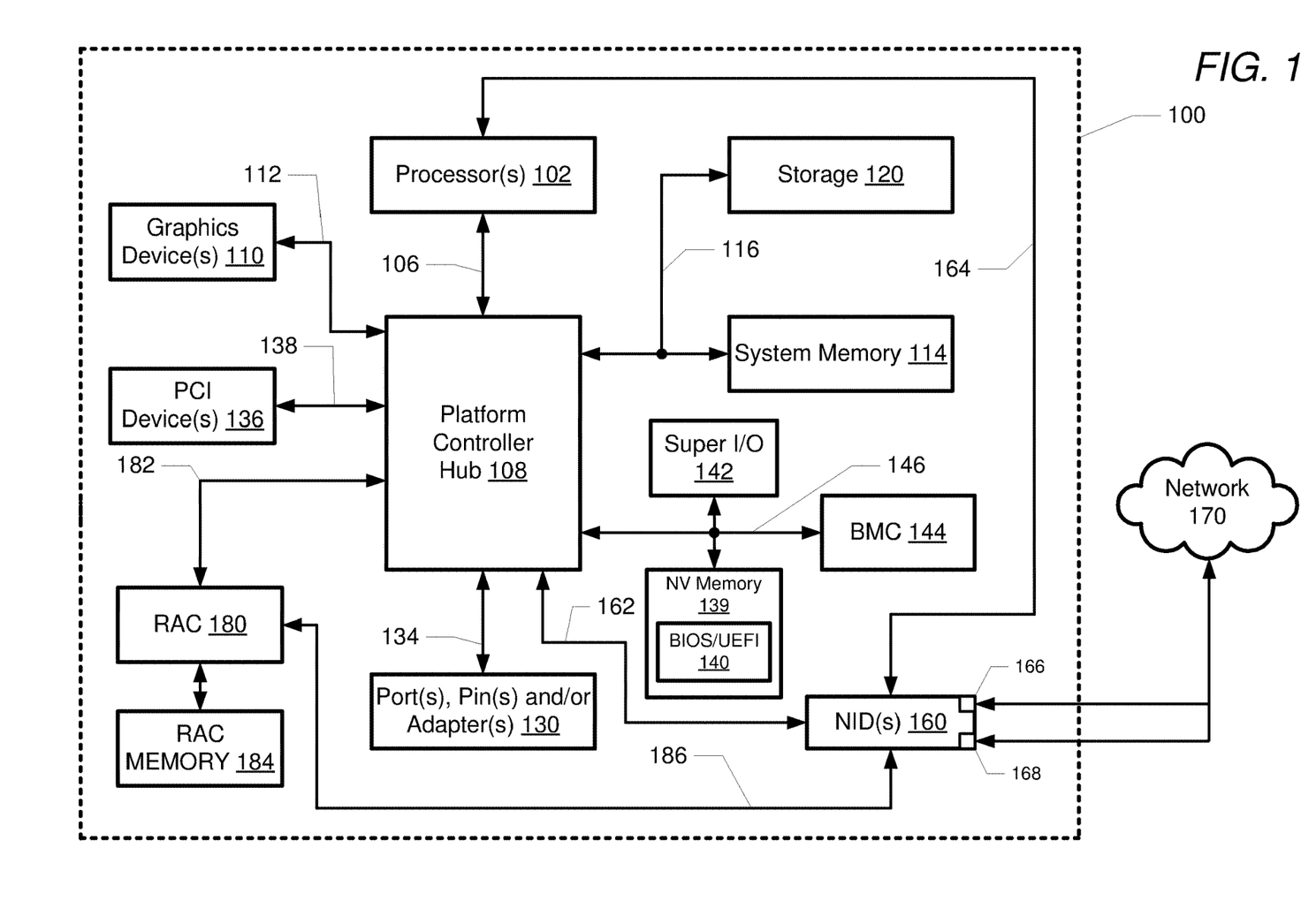
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, there is shown an example of an IHS 100. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via memory bus 116. System memory 114 may be configured to store program instructions and/or data accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by memory bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory 139 stores basic input output system/unified extensible firmware interface (BIOS/UEFI) 140. PCH 108 is also coupled to super I/O Controller 142 and baseboard management controller (BMC) 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 is in communication with NV memory 139, which can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 are also communicatively coupled to processor 102 via a sideband bus 164. NID(s) 160 enables IHS 100 to communicate and/or interface with other devices, services, and components that are located external to IHS 100. These devices, services, and components can interface with IHS 100 via an external network, such as example network 170, using one or more communication protocols. NID(s) 160 include several network ports including a primary network port 166 and a backup network port 168. NID(s) 160 are communicatively coupled to network 170 via primary network port 166 and backup network port 168. Ports 166 and 168 are endpoints of communication in an OS, which identifies a specific process or a type of network service running on that system. Ports are associated with an internet protocol (IP) address of a host IHS and the protocol type of the communication.

In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a PCI bus 182 to PCH 108. RAC 180 provides management functions that allow an administrator to deploy, monitor, manage, configure, update, troubleshoot and remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2:
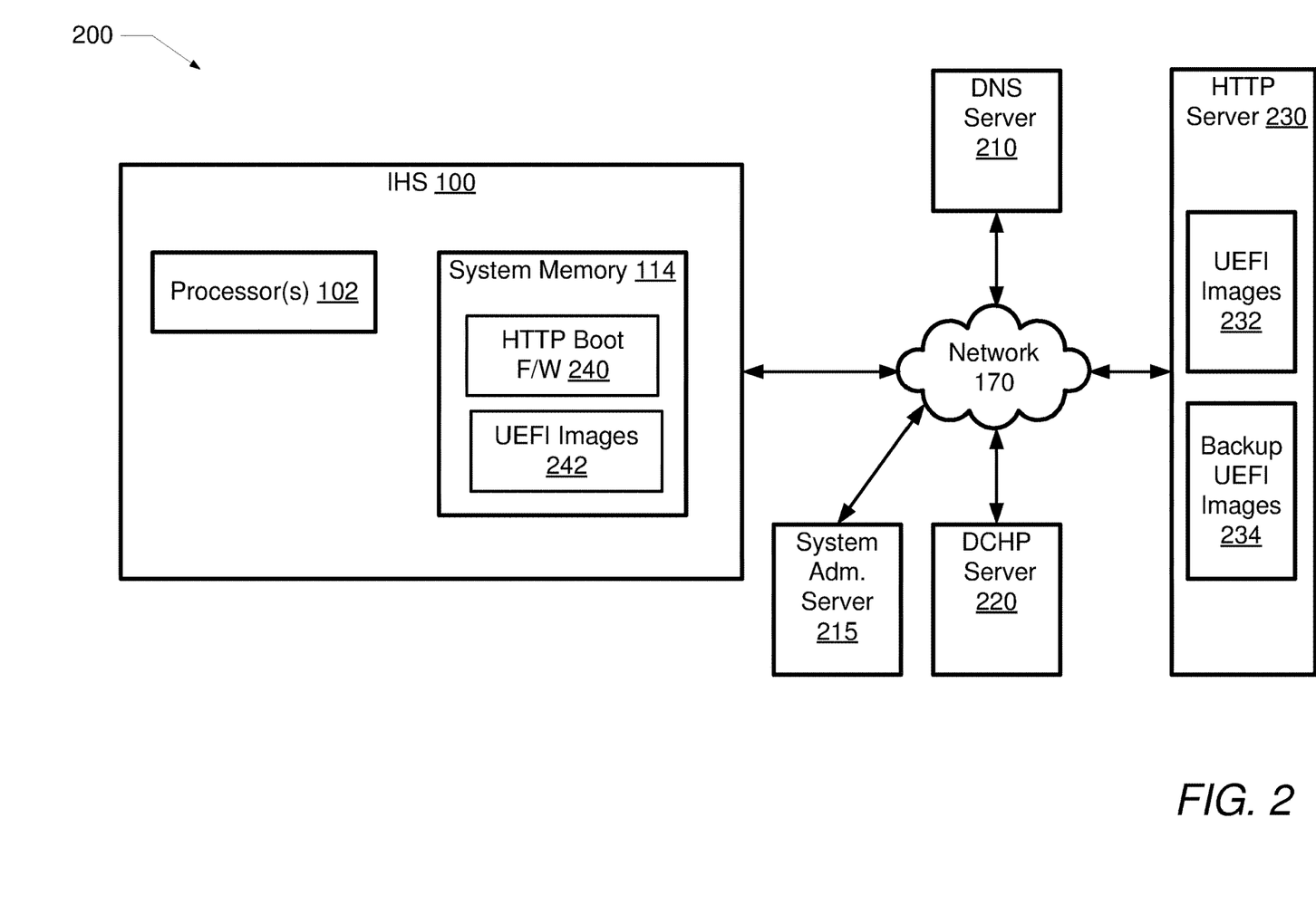
FIG. 2 illustrates one example of a networked computing system, in accordance with one or more embodiments.

In the description of each of the following figures, reference is also made to specific components illustrated within the preceding figures. With reference now to FIG. 2, one embodiment of a distributed or network computer system 200 is shown. Network computer system 200 includes dynamic host configuration protocol (DHCP) server 220, domain name system (DNS) server 210, system administrator server 215, and boot file or hypertext transfer protocol (HTTP) server 230, each of which are communicatively coupled to network 170. IHS 100 is also communicatively coupled to network 170. In different embodiments, IHS 100 can be referred to as a client IHS or a host IHS.

DNS server 210 provides domain name resolution to translate domain names to numerical IP addresses. DHCP server 220 can use a hypertext transfer protocol (HTTP) boot extension for boot service discovery. DHCP server 220 provides client configuration information such as the address, subnet, and name-server. DHCP server 220 can also provide network boot program (NBP) or UEFI image locations in uniform resource identifier (URI) format that are on HTTP server 230. HTTP server 230 can also be referred to as a boot file server. HTTP server 230 is a server that provides HTTP service, DHCP service, and DNS service to perform a network or HTTP boot function. The HTTP service can also be located within network 170. HTTP server 230 includes one or more UEFI images 232 and one or more backup UEFI images 234. System administrator server 215 can be operated by one or more users or system administrators, who can assess, diagnose, remediate and fix problems and failures in IHS 100. In one embodiment, system administrator server 215 can communicate with RAC 180 (FIG. 1) via network 170, NID 160 and sideband bus 186.

System memory 114 of IHS 100 includes HTTP boot firmware (F/W) 240 and stored received UEFI images 242. UEFI images 242 are a copy or duplicate of UEFI images 232. IHS 100 (client) executes HTTP boot firmware (F/W) 240 to install an operating system (OS), or run a service OS for maintenance and recovery tasks.

In general, a client IHS starts the DHCP process by broadcasting a DHCP request containing an HTTP boot identifier. After several intermediate steps, a boot resource location in uniform resource identifier (URI) format is provided to the client IHS. The URI points to the UEFI images on the HTTP server that are appropriate. The client IHS uses the HTTP protocol to download the UEFI images from the HTTP server to memory. The client IHS can then execute the downloaded UEFI images. More specifically, IHS 100 can initiate communication to HTTP server 230 via NID 160 and information provided by DHCP server 220 and DNS server 210. IHS 100 (client IHS) transmits a request to HTTP server 230 to download UEFI images 232. In response to the request from IHS 100, HTTP server 230 transmits UEFI images 232 to IHS 100. IHS 100 receives and stores a copy of the UEFI images, as UEFI images 242, and processor 102 boots to the OS using the UEFI images 242.

Figure 3A:
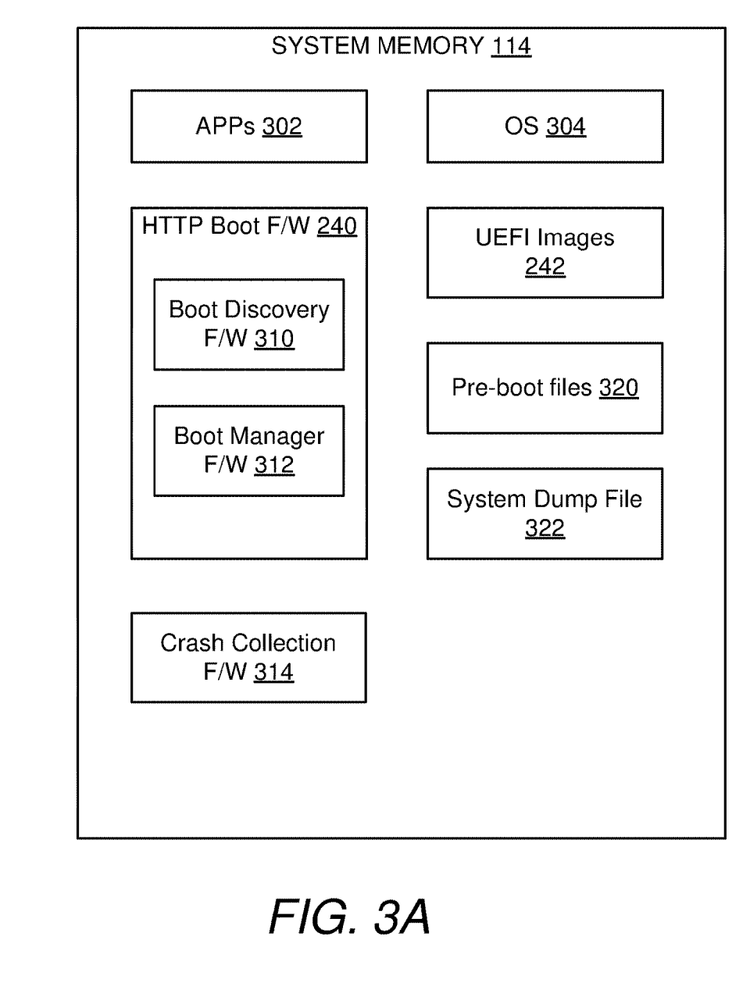
FIG. 3A illustrates example contents of a system memory in an IHS, in accordance with one or more embodiments.

With reference now to FIG. 3A, one embodiment of example contents of system memory 114 of IHS 100 is shown. System memory 114 includes data, software, and/or firmware modules, including application(s) 302, operating system (OS) 304, HTTP boot firmware (F/W) 240 and UEFI images 242. System memory 114 can also include other data, software, and/or firmware modules. HTTP boot firmware (F/W) 240 includes boot discovery F/W 310 and boot manager F/W 312. Processor 102 executes HTTP boot F/W 240 to discover, download and install an OS. HTTP boot F/W 240 performs the processes presented in the flowchart of FIGS. 7 and 9.

Processor 102 executes boot discovery F/W 310 to communicate with HTTP server 230 via NID 160 using information provided by DHCP server 220 and DNS server 210. IHS 100 transmits a request to HTTP server 230 to download UEFI images 232. In response to the request from IHS 100, HTTP server 230 transmits UEFI images 232 to IHS 100. The UEFI images are stored as UEFI images 242 in system memory 114. UEFI images 242 are program instructions usable by processor 102 to boot or load OS 304 onto IHS 100 and to facilitate communications and operation of other components of IHS 100. Boot manager F/W 312 boots or loads OS 304 onto IHS 100.

System memory 114 further includes crash collection F/W 314, pre-boot files 320, and system dump files 322. When a boot failure occurs within IHS 100, processor 102 executes crash collection F/W 314 to copy the contents of system memory 114 at the time of boot failure (e.g., pre-boot files 320 and UEFI images 242) to a pre-determined dedicated location (e.g., system dump files 322) in system memory 114. System dump files 322 contain a copy of pre-boot files 320 and UEFI images 242. Crash collection F/W 314 performs the processes presented in the flowcharts of FIGS. 6 and 8.

Figure 3B:
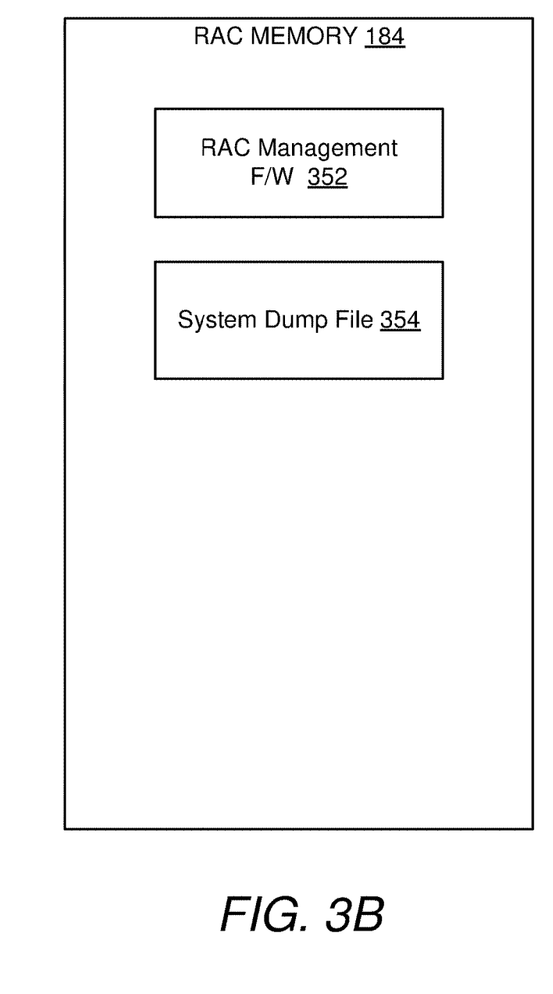
FIG. 3B illustrates example contents of a remote access controller (RAC) memory, in accordance with one or more embodiments.

Turning to FIG. 3B, one embodiment of example contents of RAC memory 184 of IHS 100 is shown. RAC memory 184 includes RAC management F/W 352 and system dump files 354. When executed by RAC 180, RAC management F/W 352 can control and manage the functions and operation of RAC 180. System dump files 354 are a copy of system dump files 322.

Figure 4:
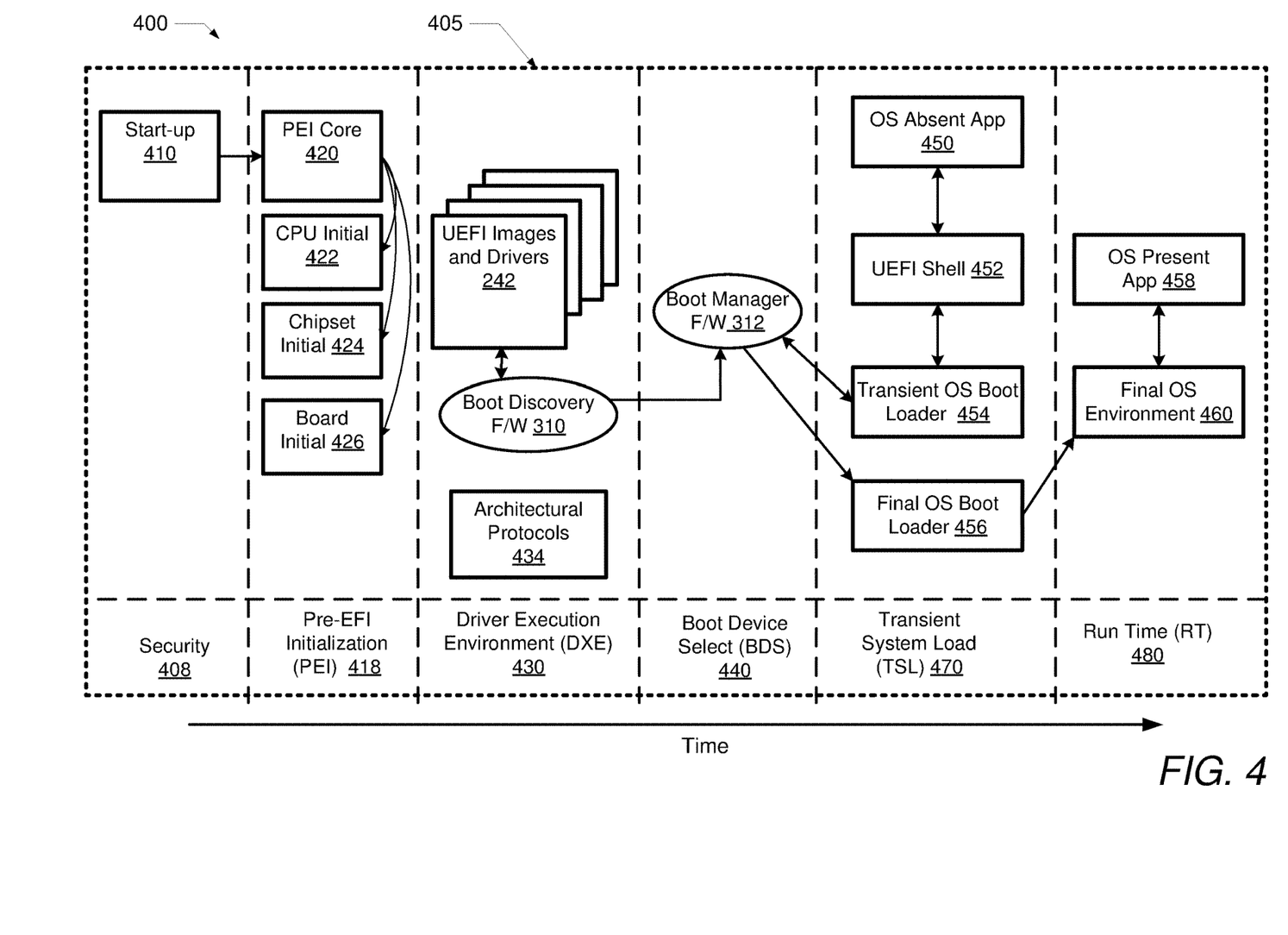
FIG. 4 illustrates a timeline of a boot-up operation or process for an IHS, in accordance with one or more embodiments.

FIG. 4 illustrates a timeline 400 of a boot operation or process 405 for IHS 100. Timeline 400 begins at start-up 410, which involves a security phase 408, where processor 102 is started and the boot process is initiated. At a pre-extensible firmware interface initialization (PEI) phase 418, a PEI core operation 420 is performed. During the PEI core operation 420, system memory 114 is initialized and firmware volume locations are described in hand off blocks. Next, CPU initialization 422 of processor 102 occurs, followed by chipset initialization 424 and then motherboard initialization 426. At a driver execution environment (DXE) phase 430, boot discovery F/W 310 discovers and retrieves UEFI images 232 and any drivers from HTTP server 230 which are then stored as UEFI images 242 (a copy of UEFI images 232). The retrieved images and/or drivers depend upon the architectural protocols 434 associated with IHS 100.

During the DXE phase 430, crash collection F/W 314 is executed to allocate a pre-determined area of system memory for the storage of system dump files if a crash occurs during booting of IHS 100. Boot discovery F/W 310 transmits UEFI images 242 and drivers to boot manager F/W 312 during the boot device selection (BDS) phase 440. At the transient system load (TSL) phase 470, either transient OS boot loader 454 or final OS boot loader 456 loads device, bus or service images or drivers to start OS 304. If transient OS boot loader 454 is selected to run, then IHS 100 enters a UEFI shell environment 452 and triggers OS absent application 450 to run. If final OS boot loader 456 is selected to run, IHS 100 loads OS 304, enters the final OS environment 460, and triggers OS present application 458 to run during the run time phase 480.

If a boot failure occurs during booting (i.e., during the BDS or TSL phases), boot manager F/W 312 triggers the execution of crash collection F/W 314 to facilitate copying the contents of system memory 114 at the time of boot failure (e.g., pre-boot files 320 and UEFI images 242) to a pre-determined dedicated location (e.g., system dump files 322) in system memory 114.

Figure 5:
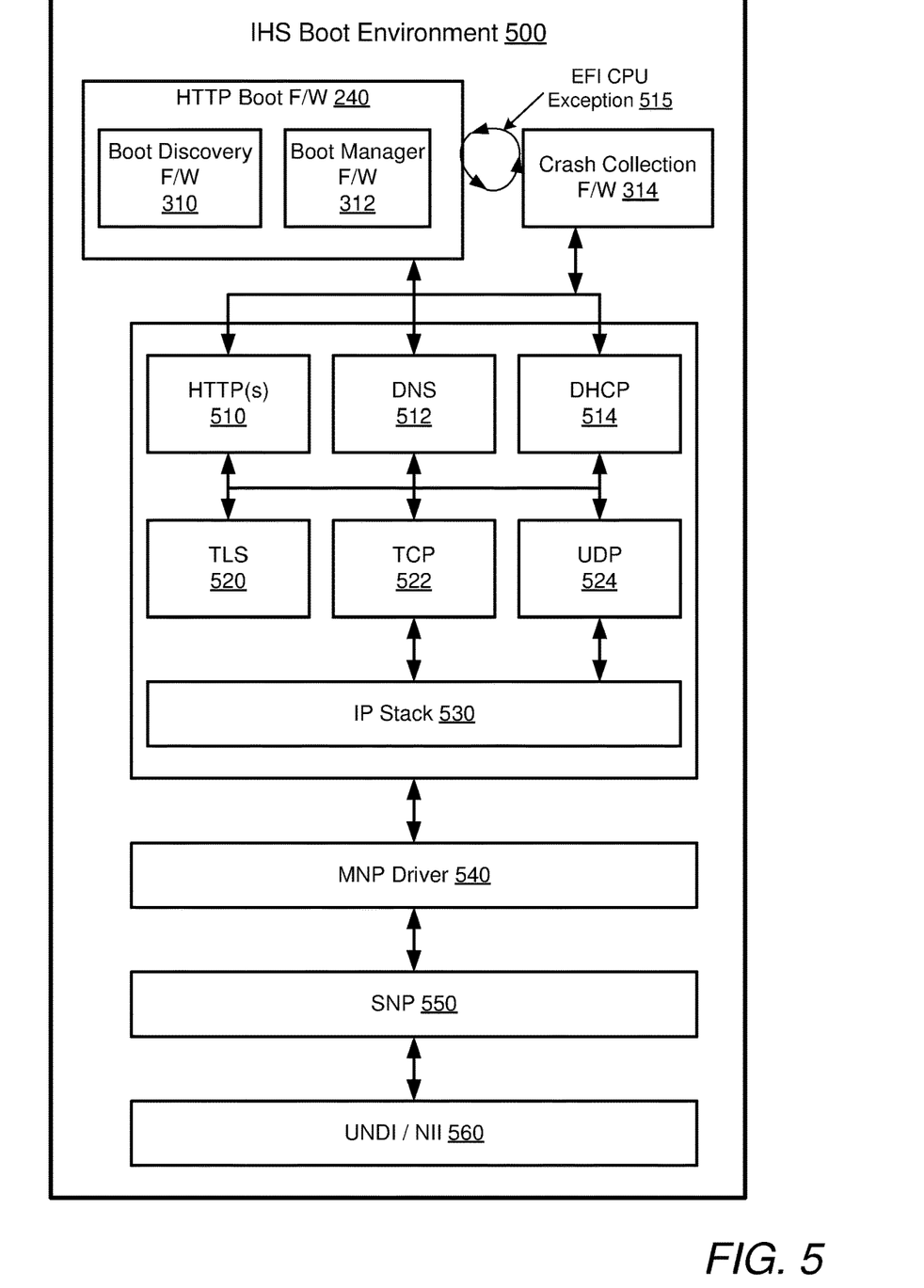
FIG. 5 illustrates a diagrammatic view of an IHS boot environment, in accordance with one or more embodiments.

FIG. 5 illustrates an IHS boot environment 500 during booting of IHS 100. IHS boot environment 500 comprises HTTP boot F/W 240 and crash collection F/W 314. HTTP boot F/W 240 includes boot discovery F/W 310 and boot manager F/W 312. Processor 102 executes HTTP boot F/W 240 to discover, download and install an OS. Processor 102 executes crash collection F/W 314 to copy the contents of system memory 114 at the time of a boot failure to a pre-determined dedicated location in system memory 114. The pre-determined location in system memory is enumerated in a device path for crash collection F/W 314 to use. In an embodiment, when a boot failure occurs, an extensible firmware interface (EFI) central processing unit (CPU) exception handler 515 is triggered, causing processor 102 to retrieve and execute the boot path driver crash collection F/W 314 to copy the contents of system memory 114 at the time of a boot failure to a pre-determined dedicated location in system memory 114.

In one embodiment, the device path to system dump file 322 in system memory 114 can be:
PciRoot (0x0)/Pci (0x19,0x0)/MAC(01234ABCDE, 0x0)/IPv 4(192.168.5.1, TCP, DHCP, 192.168.5.20, 192.168.5.1, 255.255.255.0)/Uri (http://192.168.5.1/boot.iso)/CrashDump MCDRamDisk (0x049EA000, 0x5DEA000, 0, 3D5ABD30-4175-87CE-6D64-D2ADE523C4BB)

Processor 102 executing crash collection F/W 314 can further transmit the system dump file 322 to RAC 180 and trigger RAC 180 to store system dump file 354 in RAC memory 184. In an embodiment, the device path to system dump file 354 in RAC memory 184 can be:
PciRoot (0x0)/Pci(0x20,0x0)/BMC(0x01,0x00)/CrashDumpEMMC(0x0468ACBA0000, 0x542DEA000, 0, 8DD5ABD30-4378-88EE-AA64-ABCDE523C32AA IHS boot environment 500 further comprises several application layer modules including HTTP(s) module 510, DNS module 512, DHCP module 514, transport layer security (TLS) module 520, transmission control protocol (TCP) module 522, and user datagram protocol (UDP) module 524. Each of HTTP boot F/W 240 and crash collection F/W 314 can communicate with each of HTTP(s) module 510, DNS module 512, and DHCP module 514. HTTP(s) module 510 provides software functions for HTTP services to communicate with other computers and servers. DNS module 512 provides software functions for domain name resolution to translate domain names to a numerical IP addresses. DHCP module 514 provides boot service discovery services.

Each of HTTP(s) module 510, DNS module 512, and DHCP module 514 can communicate with several transport layer modules including TLS module 520, TCP module 522, and UDP module 524. TLS module 520 provides software functions to protect the transfer of data and information over networks. TCP module 522 provides software functions for application programs to exchange packets of data over networks. UDP module 524 provides software functions that are an alternative communication protocol to TCP used for establishing low-latency and loss tolerating connections between applications.

Each of TCP module 522 and UDP module 524 can communicate with internet protocol (IP) stack 530. IP stack 530 is a set of software functions that provide network layer communication functions. IP stack 530 can communicate with managed network protocol (MNP) driver 540. MNP driver 540 provides software functions for network booting. MNP driver 540 can communicate with simple network protocol (SNP) 550. SNP 550 also provides software functions for network booting.

SNP 550 can communicate with universal network driver interface/network interface identifier (UNDI/NII) 560. UNDI/NII 560 provides software functions for network booting. In one embodiment, UNDI/NII is an interface provided by NID 160. In another embodiment, a UEFI driver can provide the functions of UNDI/NII 560. SNP 550 provides a packet level interface to NID 160. MNP driver 540 provides network packet services that allow several drivers and applications to use the system network interfaces at the same time.

In one embodiment, HTTP boot F/W 240 and crash collection F/W 314, executing on processor 102, transmits a request to HTTP server 230 for at least one UEFI image 232. Processor 102 receives the at least one UEFI image from the HTTP server 230 and boots IHS 100 using the received UEFI image 242. Processor 102 determines if a boot failure of the IHS has occurred. In response to determining that a boot failure of the IHS has occurred, processor 102 identifies a memory location in system memory 114 for storage of a system dump file. Processor 102 stores the contents of system memory 114 to system dump file 322 at the identified memory location.

FIGS. 6, 7, 8 and 9 illustrate flowcharts of exemplary methods 600, 700, 800 and 900 by which processor 102 within the preceding figures performs different aspects of the processes that enable the one or more embodiments of the disclosure. Generally, method 600 represents a method for allocating system memory for the storage of system dump files during a network boot failure. Method 700 represents a method for network booting. Method 800 represents a method for capturing system dump files during a network boot failure. Method 900 represents a method for network re-booting.

The description of methods 500, 600, 700 and 800 is provided with general reference to the specific components illustrated within the preceding FIGS. 1-5. Methods 600 and 800 are described as being implemented via processor 102 and particularly the execution of code provided by crash collection F/W 314 acting within processor 102. Methods 700 and 900 are described as being implemented via processor 102 and particularly the execution of code provided by HTTP boot F/W 240 acting within processor 102. It is however appreciated that certain aspects of the described methods may be implemented via other processing devices and/or execution of other code.

Figure 6:
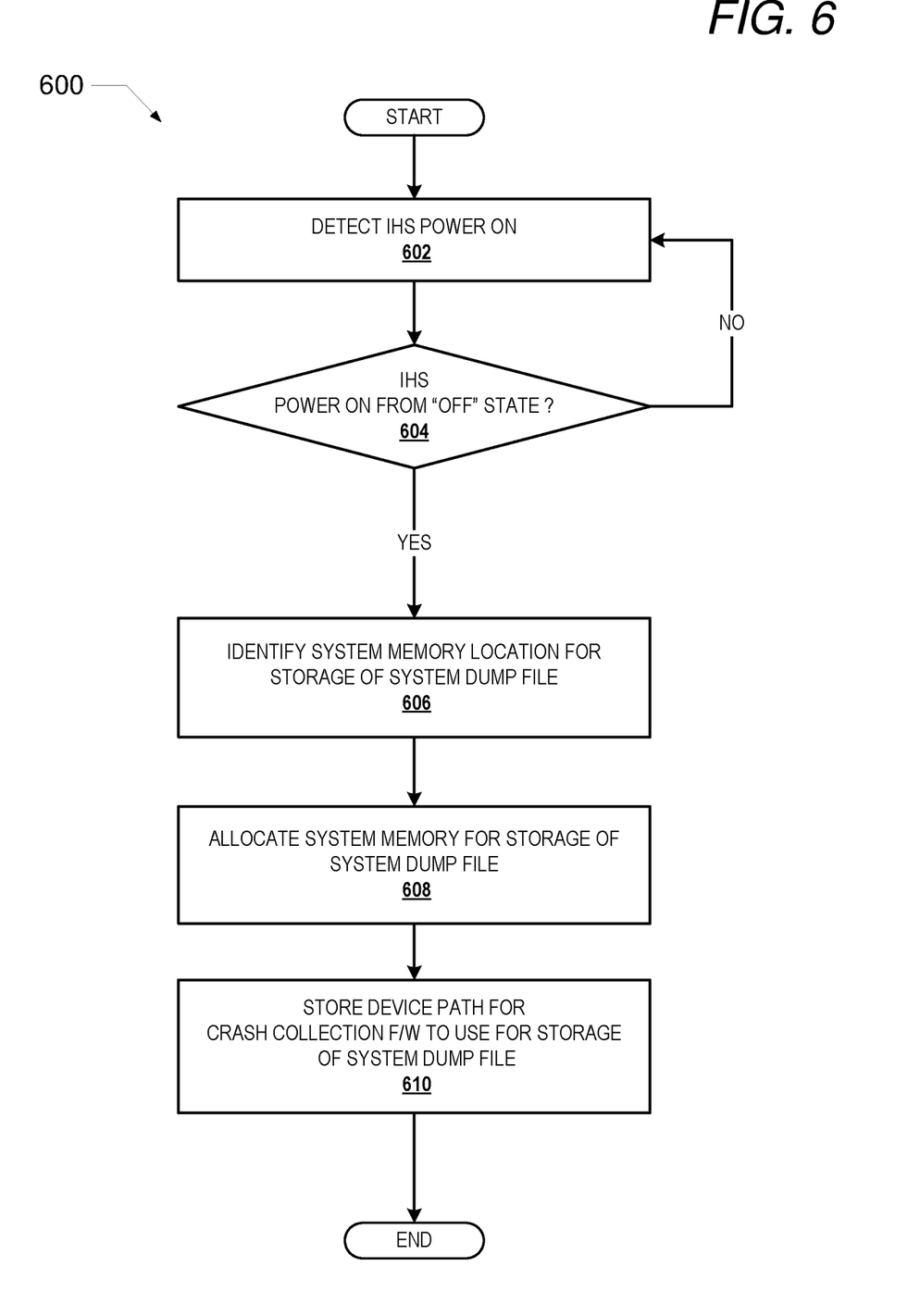
FIG. 6 is a flow chart illustrating one example of a method for allocating system memory for the storage of system dump files during a network boot failure, according to one or more embodiments.

Referring to the flow chart of FIG. 6, method 600 begins at the start block and proceeds to block 602 where processor 102 detects that IHS 100 has been powered on, such that the processor and other functional components receive a full complement of power required to operate. At decision block 604, processor 102 determines if the powering on of IHS 100 involved powering on (i.e., providing system power to the components of IHS 100) from an off state. In response to IHS 100 not being powered on from an off state, method 600 returns to block 602 to continue detecting a power on condition that occurs from an off state of the IHS 100.

In response to IHS 100 being powered on from an off state, processor 102 identifies a memory location in system memory 114 for storage of a system dump file (block 606) and allocates the memory location in system memory 114 for storage of the system dump file (block 608). Processor 102 stores a device path/memory location to the allocated memory location in crash collection F/W 314 (block 610). Method 600 concludes at the end block.

Figure 7:
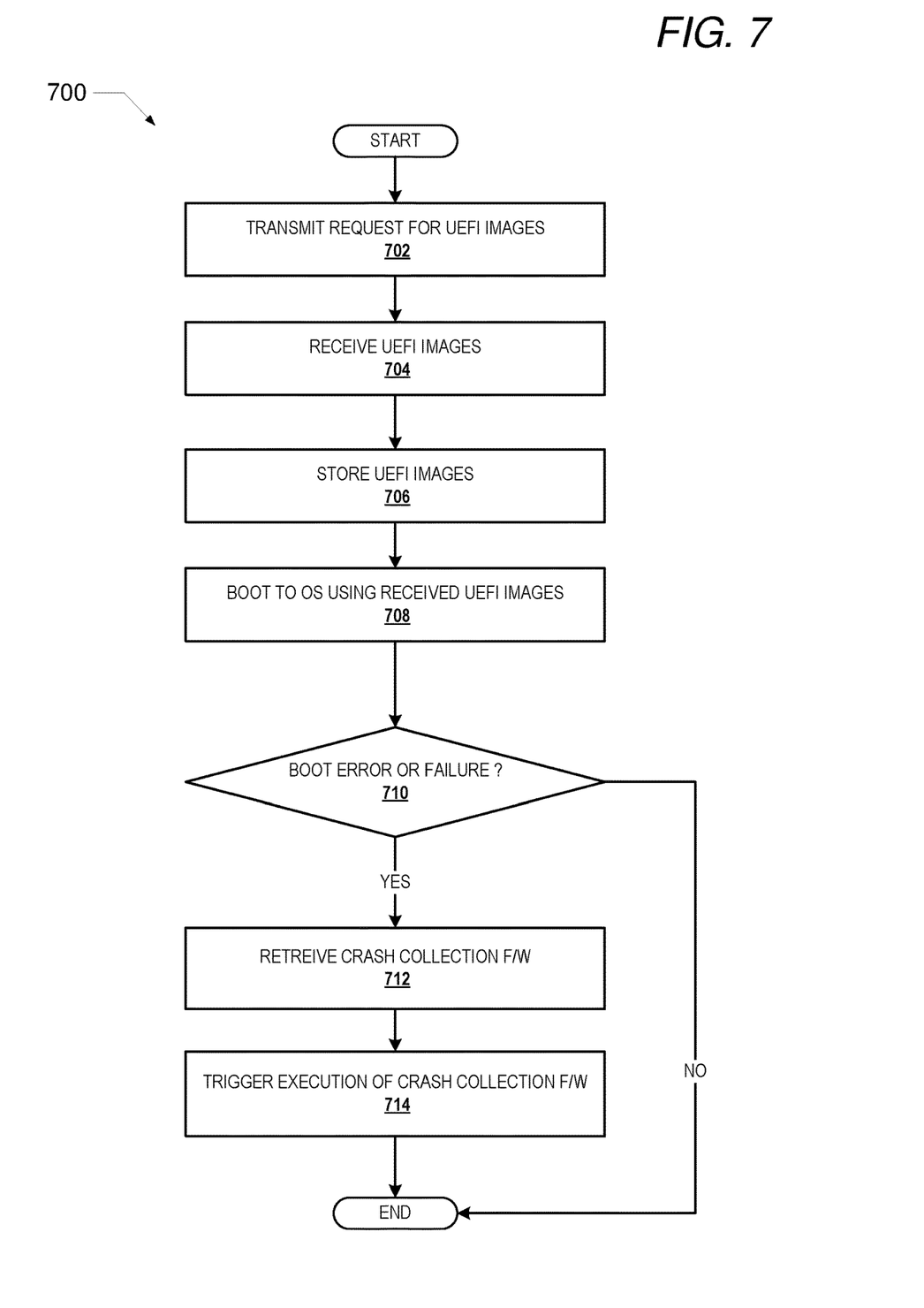
FIG. 7 is a flow chart illustrating one example of a method for network booting, according to one or more embodiments.

FIG. 7 illustrates a method for network or HTTP booting of an IHS. Method 700 begins at the start block and proceeds to block 702 where processor 102 transmits a request, via network 170, to HTTP server 230 for at least one UEFI image 232. Processor 102 receives the at least one UEFI image 232 from HTTP server 230 (block 704). Processor 102 stores the received UEFI images to system memory 114 as UEFI images 242 (block 706) and boots to the OS using the received UEFI images 242 (block 708).

At decision block 710, processor 102 determines if a boot failure of IHS 100 has occurred. In response to determining that a boot failure of IHS 100 has not occurred (i.e. OS 304 has properly loaded), method 700 terminates. In response to determining that a boot failure of IHS 100 has occurred, processor 102 retrieves crash collection F/W 314 (block 712) and triggers crash collection F/W 314 to begin execution (block 714). Method 700 then ends.

Figure 8:
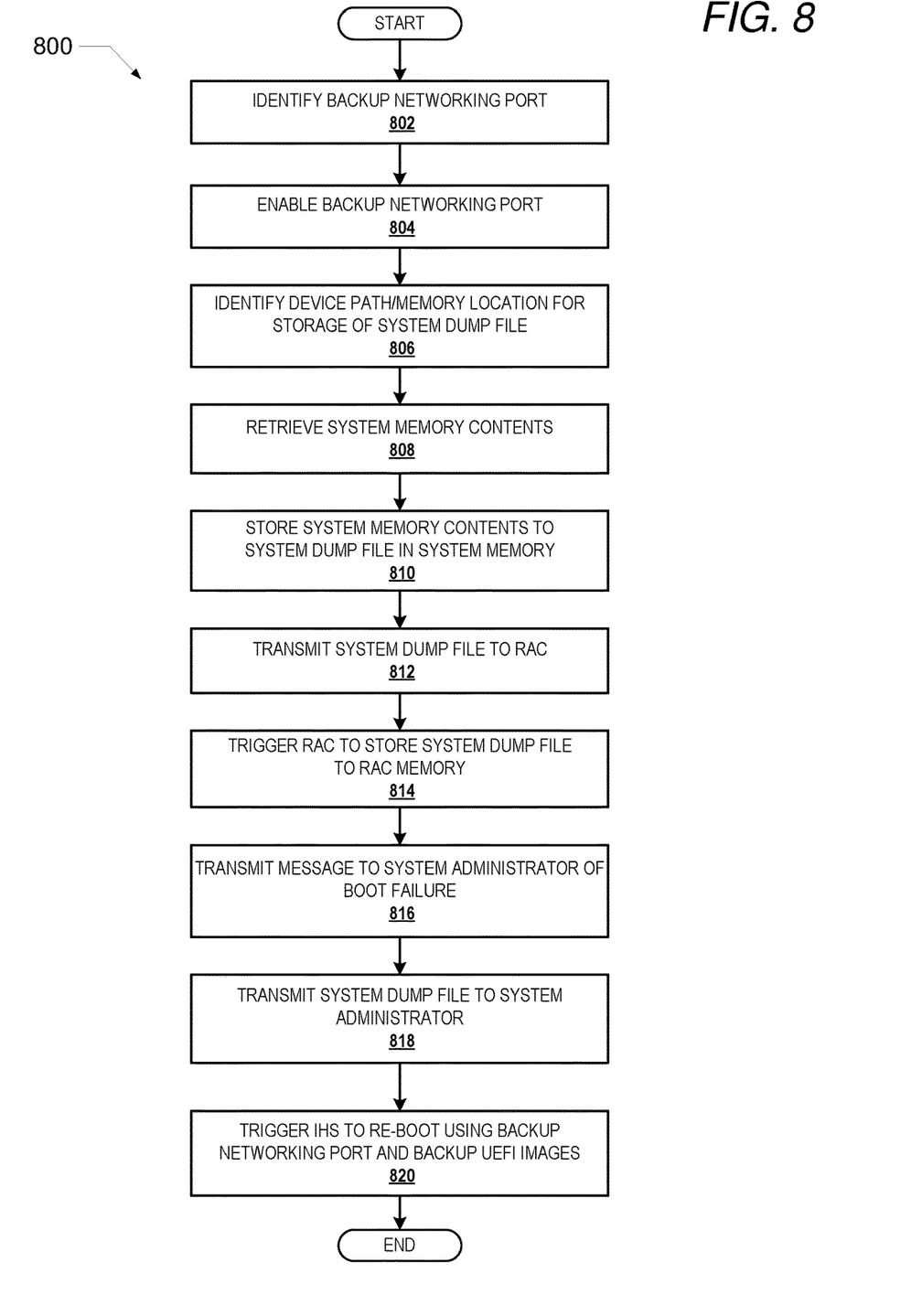
FIG. 8 is a flow chart illustrating one example of a method for capturing system dump files during a network boot failure, according to one or more embodiments.

FIG. 8 illustrates a method for capturing system dump files during a network boot failure. Method 800 begins at the start block and proceeds to block 802 where processor 102 identifies a backup networking port 168 of IHS 100. Processor 102 enables operation of the backup networking port via NID 160 (block 804). Processor 102 identifies a device path/memory location in system memory 114 for storage of a system dump file (block 806). In one embodiment, the device path/memory location can be stored with crash collection F/W 314 during a provisioning process of IHS 100. Processor 102 retrieves contents of system memory 114 during the boot failure (i.e., UEFI images 242 and pre-boot files 320) (block 808) and stores these memory contents to system memory 114 in system dump file 322 (block 810). In an embodiment, when a boot failure occurs, the pre-boot files 320 can contain all of the failed boot code and any generated failure messages/outputs including any failure messages that appear on a display of IHS 100.

At block 812, processor 102 transmits system dump file 322 to RAC 180 and triggers RAC 180 to store the system dump file as system dump file 354 in RAC memory 184 (block 814). Processor 102, via NID 160 and network 170, transmits a message to the system administrator server 215 that booting of the IHS has failed and that the system dump file is stored in RAC memory 184 (block 816). Processor 102 transmits system dump file 322 to the system administrator server 215 (block 818). Processor 102 triggers IHS 100 to re-boot using backup networking port 168 to request backup UEFI images 234 from HTTP server 230 (block 820). Method 800 concludes at the end block.

Figure 9:
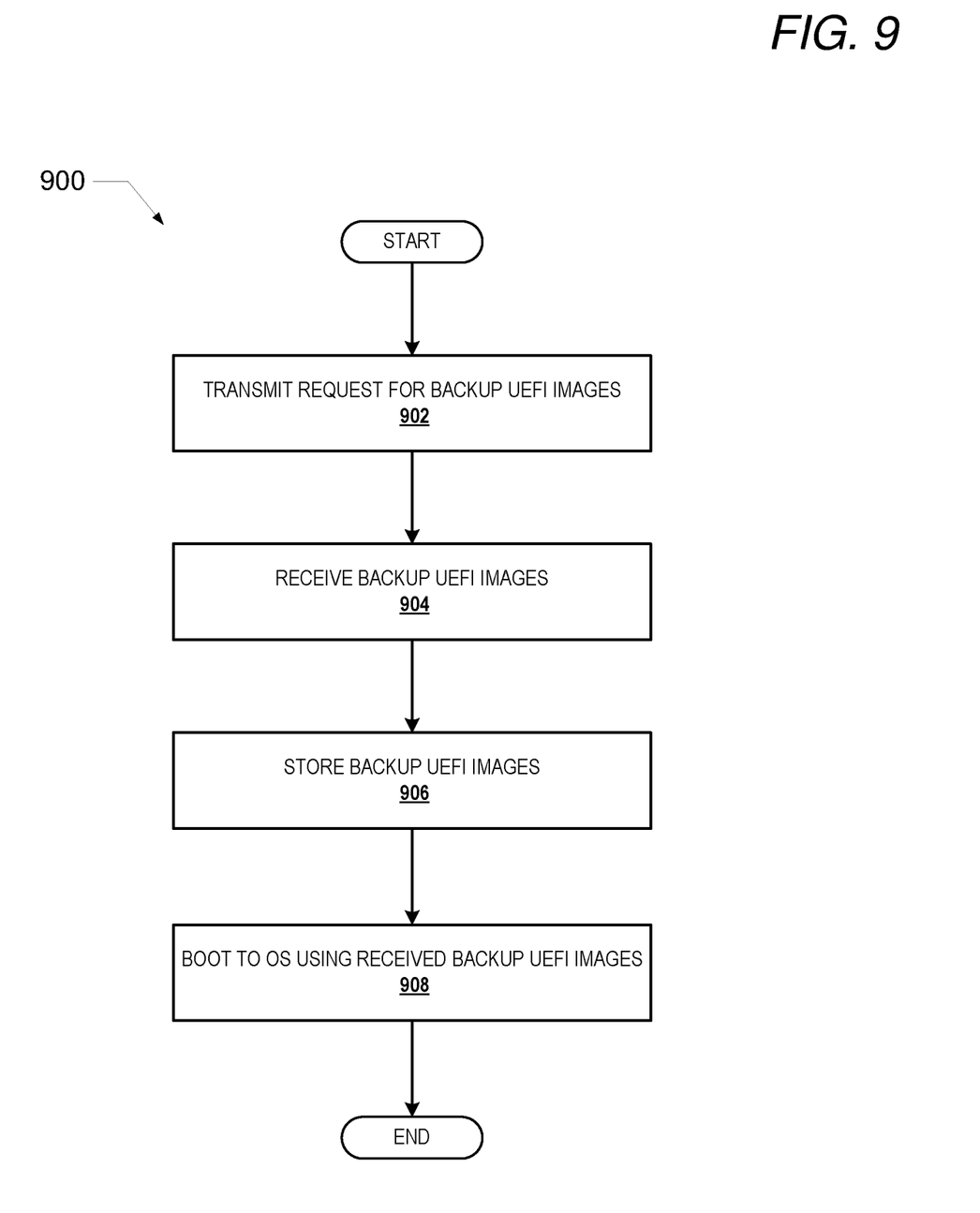
FIG. 9 is a flow chart illustrating an example of a method for network re-booting, according to one or more embodiments.

FIG. 9 illustrates a method for network-based re-booting. Method 900 begins at the start block and proceeds to block 902 where processor 102 transmits a request, via backup networking port 168 and network 170, to HTTP server 230 for at least one backup UEFI image 234. Processor 102 receives the at least one backup UEFI image 234 from HTTP server 230 (block 904). Processor 102 stores the received backup UEFI images to system memory 114 as UEFI images 242 (block 906) and boots to the OS using the received backup UEFI images (block 908). Method 900 then terminates.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for managing boot failures in an information handling system (IHS), the method comprising:
transmitting, via a processor, a request for at least one unified extensible firmware interface (UEFI) image from a boot file server;
receiving the at least one UEFI image from the boot file server;
booting the IHS using the UEFI image;
determining if a boot failure of the IHS has occurred;
in response to determining that a boot failure of the IHS has occurred:
identifying a memory location in a first memory device for storage of a system dump file;
storing contents of the first memory device to the system dump file at the identified memory location of the first memory device;
identifying a backup networking port;
enabling the backup networking port; and
triggering the IHS to reboot using the backup networking port.

2. The method of claim 1, further comprising:
transmitting a request to the boot file server, via the backup networking port, for a backup UEFI image;
receiving the backup UEFI image from the boot file server; and
booting the IHS using the backup UEFI image.

3. The method of claim 1, further comprising:
during initialization of the IHS:
identifying a memory location in the first memory device for storage of the system dump file;
allocating memory in the first memory device for storage of the system dump file; and
storing, to the first memory device, a device path and the memory location for storage of the system dump file.

4. A method for managing boot failures in an information handling system (IHS), the method comprising:
transmitting, via a processor, a request for at least one unified extensible firmware interface (UEFI) image from a boot file server;
receiving the at least one UEFI image from the boot file server;
booting the IHS using the UEFI image;
determining if a boot failure of the IHS has occurred;
in response to determining that a boot failure of the IHS has occurred, identifying a memory location in a first memory device for storage of a system dump file;
storing contents of the first memory device to the system dump file at the identified memory location of the first memory device; and
storing the system dump file to a second memory device associated with a remote access controller (RAC), the system dump file stored on the second memory device being accessible to a system administrator server via a network interface device (NID).

5. The method of claim 4, further comprising:
transmitting, via the NID, a message to the system administrator server that booting of the IHS has failed and that the system dump file is stored on the second memory device.

6. The method of claim 4, further comprising:
transmitting the system dump file to the system administrator server.

7. An information handling system (IHS) comprising:
a processor communicatively coupled to a first memory device, the processor further communicatively coupled to a boot file server, the processor having firmware executing thereon for managing boot failures in the IHS, wherein the firmware configures the processor to:

transmit a request for at least one unified extensible firmware interface (UEFI) image from a boot file server;
receive the at least one UEFI image from the boot file server;
boot the IHS using the UEFI image;
determine if a boot failure of the IHS has occurred;
in response to determining that a boot failure of the IHS has occurred:
identify a memory location in a first memory device for storage of a system dump file;
store contents of the first memory device to the system dump file at the identified memory location of the first memory device;
identify a backup networking port;
enable the backup networking port; and
trigger the IHS to reboot using the backup networking port.

8. The information handling system of claim 7, further comprising:
a remote access controller (RAC) having a second memory device associated therewith;
wherein the firmware further configures the processor to:
store the system dump file to the second memory device associated with the RAC, the system dump file stored on the second memory device being accessible to a system administrator server via a network interface device (ND).

9. The information handling system of claim 8, wherein the firmware further configures the processor to:
transmit, via the NID, a message to the system administrator server that booting of the IHS has failed and that the system dump file is stored on the second memory device.

10. The information handling system of claim 8, wherein the firmware further configures the processor to:
transmit the system dump file to the system administrator server.

11. The information handling system of claim 7, wherein the firmware further configures the processor to:
transmit a request to the boot file server, via the backup networking port, for a backup UEFI image;
receive the backup UEFI image from the boot file server; and
boot the IHS using the backup UEFI image.

12. The information handling system of claim 7, wherein the firmware further configures the processor to:
during initialization of the IHS:
identify a memory location in the first memory device for storage of the system dump file;
allocate memory in the first memory device for storage of the system dump file; and
store, to the first memory device, a device path and the memory location for storage of the system dump file.

13. A management system for managing boot failures in an information handling system (IHS), the management system comprising:
a processor communicatively coupled to a first memory device, the processor further communicatively coupled to a boot file server, the processor having firmware executing thereon for managing boot failures in the IHS, wherein the firmware configures the processor to:
transmit a request for at least one unified extensible firmware interface (UEFI) image from a boot file server;
receive the at least one UEFI image from the boot file server;
boot the IHS using the UEFI image;
determine if a boot failure of the IHS has occurred;
in response to determining that a boot failure of the IHS has occurred, identify a memory location in a first memory device for storage of a system dump file; and
store contents of the first memory device to the system dump file at the identified memory location of the first memory device; and
a remote access controller (RAC) having a second memory device associated therewith;
wherein the firmware further configures the processor to store the system dump file to the second memory device associated with the RAC, the system dump file stored on the second memory device being accessible to a system administrator server via a network interface device (NID).

14. The management system of claim 13, wherein the firmware further configures the processor to:
transmit, via the NID, a message to the system administrator server that booting of the IHS has failed and that the system dump file is stored on the second memory device.

15. The management system of claim 13, wherein the firmware further configures the processor to:
transmit the system dump file to the system administrator server.

16. The management system of claim 13, wherein the firmware further configures the processor to:
identify a backup networking port;
enable the backup networking port; and
trigger the IHS to reboot using the backup networking port.

17. The management system of claim 16, wherein the firmware further configures the processor to:
transmit a request to the boot file server, via the backup networking port, for a backup UEFI image;
receive the backup UEFI image from the boot file server; and
boot the IHS using the backup UEFI image.

* * * * *